United States Patent [19]

Hallstrom

[11] 4,144,918

[45] Mar. 20, 1979

[54] TREE HARVESTER AND TRANSPORTER

[76] Inventor: Charles A. Hallstrom, Eben, Mich. 49825

[21] Appl. No.: 830,762

[22] Filed: Sep. 6, 1977

[51] Int. Cl.² ............................................. A01G 23/08
[52] U.S. Cl. ..................................... 144/3 D; 91/171; 144/2 Z; 414/708
[58] Field of Search .................. 144/2 Z, 3 D, 34 R, 144/34 E, 309 AC; 83/928, 698; 214/771; 91/171

[56] References Cited

U.S. PATENT DOCUMENTS

| | | | |
|---|---|---|---|
| 2,843,165 | 7/1958 | Sherron | 144/3 D |
| 3,288,316 | 11/1966 | West | 214/771 |
| 3,542,099 | 11/1970 | Gibson | 144/3 D |
| 3,596,690 | 8/1971 | Hamilton | 144/2 Z |
| 3,620,272 | 11/1971 | Eriksson | 144/3 D |
| 3,669,161 | 6/1972 | Gutman et al. | 144/3 D |
| 3,688,822 | 9/1972 | Gutman et al. | 144/3 D |
| 3,693,680 | 9/1972 | Moser et al. | 144/3 D |
| 3,763,905 | 10/1973 | Hamilton | 144/3 D |
| 3,797,539 | 3/1974 | Moser et al. | 144/3 D |
| 3,797,541 | 3/1974 | Kurelek et al. | 144/3 D |
| 3,842,872 | 10/1974 | Moser et al. | 144/3 D |
| 3,881,533 | 5/1975 | Savage et al. | 144/3 D |
| 3,882,910 | 5/1975 | Petola et al. | 144/3 D |
| 3,886,984 | 6/1975 | Engel | 144/3 D |
| 3,886,985 | 6/1975 | Iarocci et al. | 144/309 AC |
| 3,960,189 | 6/1976 | Windsor et al. | 144/2 Z X |
| 3,981,336 | 9/1976 | Levesque | 144/3 D |

Primary Examiner—Othell M. Simpson
Assistant Examiner—W. D. Bray
Attorney, Agent, or Firm—McGarry & Waters

[57] ABSTRACT

A mobile tree harvester includes a shear mounted at the base of a harvesting frame for shearing a tree trunk, a grip arm pivotably mounted to the frame above the shear for gripping the tree trunk, delimbers mounted above the grip arms for removing branches from the trunk, and an endless tract mounted on each grip arm for propelling the tree trunk along the forward frame. Lift arms pivotably couple the forward frame to a main body of a wheeled vehicle. A sway mechanism is coupled to both lift arms to provide for relative movement of one lift arm with respect to the other such that the harvesting frame can sway from the vertical position in a left or right direction. A tilt mechanism is coupled to the harvesting frame, lift arm, and main body to maintain the frame in its vertical ground position as the lift arms lift the frame off the ground. The tilt mechanism also tilts the frame about an axis transverse to the vehicle axis to a horizontal position such that the sheared end of the tree trunk faces rearwardly. Behind the frame is a storage space within the main body adapted to receive the tree trunks as the endless tracks propel the tree trunk therein and to store a plurality of logs therein. Movable panels at the bottom of the storage area release the logs when desired.

13 Claims, 10 Drawing Figures

TREE HARVESTER AND TRANSPORTER

BACKGROUND OF THE INVENTION

1. Field of the Invention

This invention relates generally to tree harvesters and more particularly to a tree harvester which can accommodate trees growing in an angled position and can transport a plurality of logs to a desired position.

2. State of the Prior Art

Many tree processors are available on the market which shear, delimb, and cut tree trunks to predetermined lengths. Most of the tree harvesters are mobile in character and can be driven to the particular tree which is to be felled. An apparatus of the above description is disclosed in U.S. Pat. No. 3,881,533 issued to Savage et al. on May 6, 1975. Savage et al. discloses a tree harvester with a forward frame mounting a shear and grip arms. Each grip arm has a plurality of driven sprockets, each having teeth for engaging the tree trunk. Hydraulic pistons lift the forward frame and angle it horizontally above the cab section. To the rear and above the cab are delimber blades. The sprockets drive the tree trunk forward and the shear blade cuts the tree trunk into logs of selected lengths.

Another such device is disclosed in U.S. Pat. No. 2,843,165 to Sherron issued on July 15, 1968. Sherron discloses a mobile tree harvester which shears the tree trunk and drives the tree trunk between the wheels of the harvester below a cab section for delimbing and cutting the trunk into sections.

A tree harvester with a transporter is disclosed in U.S. Pat. No. 3,797,541 issued to Kurelek et al. on Mar. 19, 1974. Kurelek et al. discloses a shear, grippers, and delimbers mounted on the frame. The frame is articulated to a boom. The track means moves the tree trunk over an open topped storage box into which the delimbed logs drop. The chassis underneath the box is pivotably mounted to the chassis of the cab section.

Most of the machines on the market have great size and lack maneuverability. These limitations often make these machines useless in relatively densely wooded areas where selected felling is desired. To overcome these limitations, compromises in the machines were introduced which eliminated the accumulators which transported the logs. The processed logs were individually dropped on the ground to be individually dragged or picked up by a separate transporter, resulting in extra steps and extra costs in tree harvesting.

SUMMARY OF THE INVENTION

According to the invention, a tree harvester has a processing assembly including shear means for cutting the trunk of a tree, delimber means for delimbing branches from the trunk, gripper means for retaining the tree and track means for moving the tree through the processing assembly.

In one embodiment, the gripping means are two arms pivotably connected to the processing assembly. The track means is an endless track mounted on each gripping arm with each endless track driven by a motor.

Further according to the invention, lift means for raising the processing assembly is coupled thereto. Preferably, two lift arms are pivotably connected to the processing assembly at horizontally spaced apart pivot points. Means for biasing the lift arms are connected thereto.

Further according to the invention, a self-propelled vehicle behind the processing assembly includes a storage space for receiving and storing cut tree logs. The storage space has a means for releasing the contained logs. Preferably, the release means includes an openable floor which, when opened, allows the logs to fall to the ground. The storage space is formed between pairs of wheels at the side of the vehicle. All wheels are mounted onto the sides of the vehicle frame to free the storage space from any axles extending through or underneath the storage area. Preferably, the cab section is located directly above the storage space.

The processing assembly is connected to tilt means for pivoting the processing assembly to a horizontal position along an axis extending from the front of the tree harvester to the back thereof. When the processing assembly is in the horizontal position, the shear blade is rearward of the delimber means and gripping means. Preferably, the tilt means includes a pair of piston and cylinder means pivotably mounted to each lift arm and near each side of the processing assembly. In this specific embodiment, fluid pressure can be controllably reduced or raised to slide the piston means relative to the cylinder means for tilting the processing assembly to the horizontal position.

In one embodiment, means are connected to the lift means for maintaining the processing assembly upright as the processing assembly is lifted off the ground. Desirably, means are connected to the lift arms for sensing the height of the lift arm. The sensing means is operably connected to the tilt means such that when the first lift arms are raised or lowered, the sensing means senses the movement and controls the tilt means to retain the processing assembly in its initial horizontal position along the longitudinal axis of the vehicle. Preferably, the sensing means includes at least two fluidic chambers. The amount of fluid in each chamber is determined by the height of the lift arms.

Further according to the invention, sway means are connected to the lift arm for providing angular movement of the processing assembly in a plane transverse to the vehicle axis. Desirably, the sway means include means for moving one lift arm with respect to the second lift arm. As the lift arms move with respect to one another, the sensing means senses the different heights of the two lift arms and controls the tilt means to maintain the processing assembly aligned in its initial longitudinal plane.

The apparatus is suitable for selectively processing trees in a relatively densely wooded area. The processing assembly is angularly maneuverable in both a longitudinal and transverse plane relative to the length of the tree harvester. The processing assembly is also retained in its initial angular position as the lift means raise the tree off the ground. The self-propelled tree harvester is designed to provide a storage assembly to accumulate and transport a plurality of logs and to release the logs at desired locations.

DETAILED DESCRIPTION OF THE PREFERRED EMBODIMENT

Figure 1:
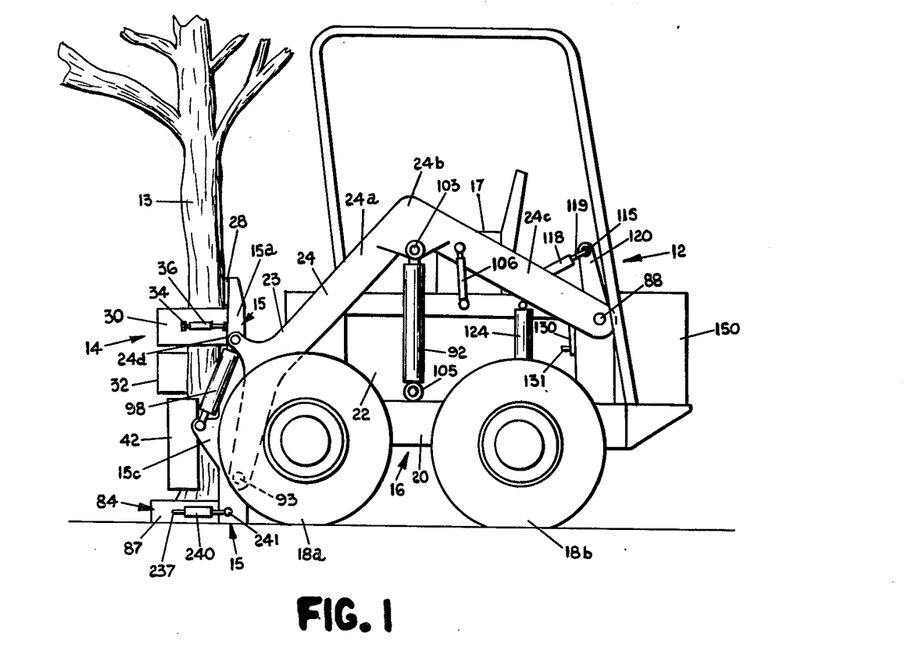
FIG. 1 is a side elevational view of an embodiment of the invention adjacent a tree.

Referring particularly to FIG. 1, a tree harvester 12 includes a front processing assembly 14 and a mobile main body 16. The main body 16 includes a cab section 17 located above and between four motor driven wheels 18a, b, c and d. The wheels are connected to the structural chassis 20. Within the chassis is a storage space 22 capable of receiving and storing logs. Coupling the processing assembly to the main chassis are a pair of lift arms 24.

As shown in FIGS. 1 through 4, the processing assembly includes a frame 15. The frame 15 has two spaced apart upright posts 15a and 15b. Frontward protrusions 15c and 15d extend from the respective upright posts 15a and 15b.

Figure 4:
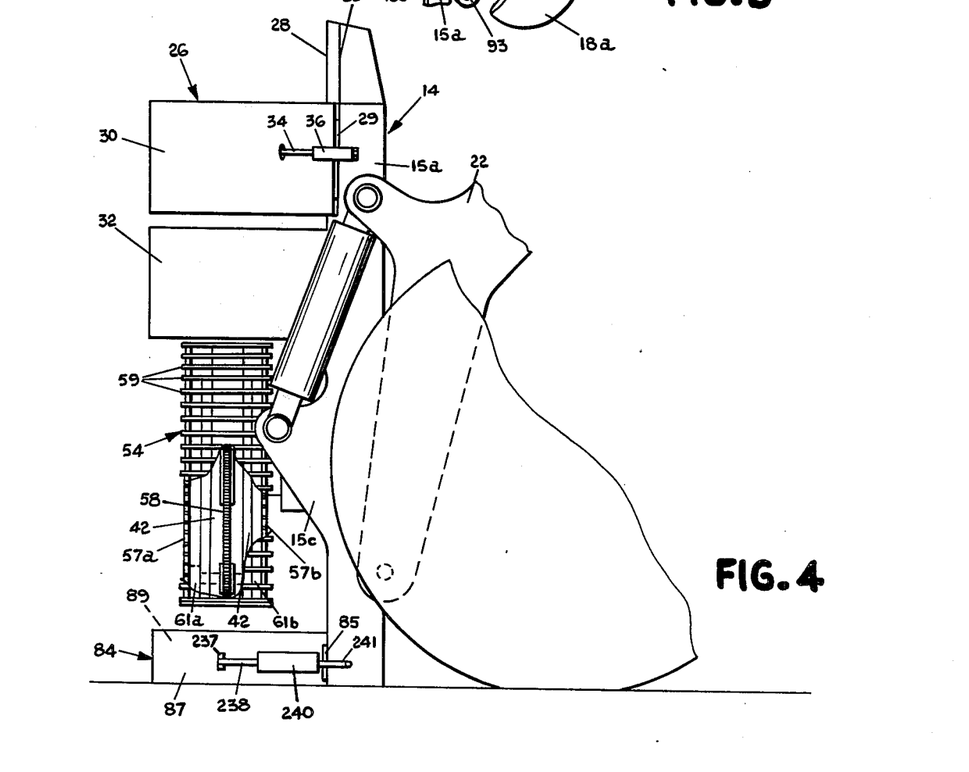
FIG. 4 is an enlarged partially broken side elevational view of the processing assembly.
Figure 5:
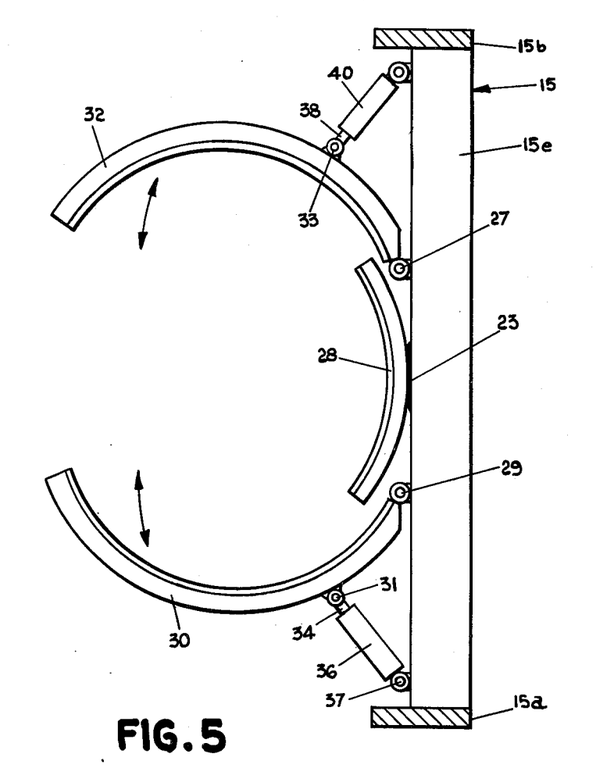
FIG. 5 is an enlarged plan view of the delimbers shown in FIG. 4.

Referring to FIGS. 4 and 5, the processing assembly includes a delimber mechanism 26 comprising a stationary knife 28 and two opposing and pivotable knives 30 and 32. As clearly shown in FIG. 5, knife 28 is welded to plate 15e of frame 15 at weld 23. The plate 15e extends between and is connected to both posts 15a and 15b. Knife 30 is pivotably connected through hinge 29 to frame 15. Knife 30 is pivotably jointed through hinge 31 to the outer end of piston rod 34 of a main fluid cylinder 36. Fluid cylinder 36 is pivotably mounted through hinge 37 onto frame 15 of the processing assembly 14. Likewise, knife 32 is pivotably mounted through hinge 27 to frame 15. Pivotable knife 32 is pivotably mounted through hinge 33 to piston rod 38 which in turn is slidably mounted in main fluid cylinder 40. Main fluid cylinder 40 is also pivotably mounted on frame 15 through hinge 41.

Figure 6:
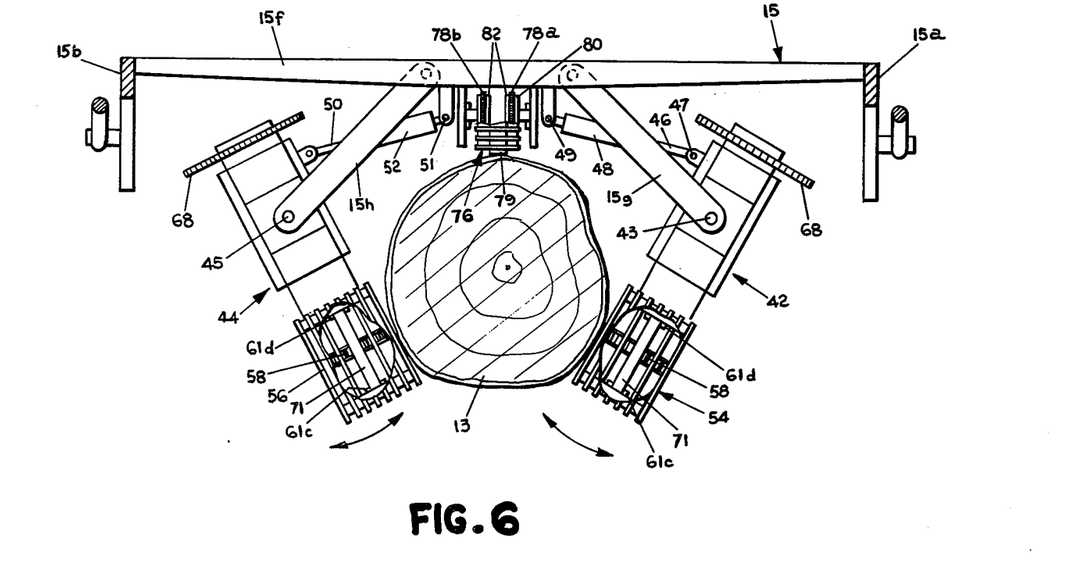
FIG. 6 is an enlarged partially broken plan view of the grip arms and tracks as shown in FIG. 4.

Referring to FIGS. 4 and 6, two grip arms 42 and 44 are pivotably attached to frame 15 below the delimber mechanism 26 rigidly connected to cross bar 15f. Cross bar 15f extends between and is fixed to both posts 15a and 15b. More specifically, grip arm 42 is connected through pivot pin 43 to flange 15g. Grip arm 42 is also pivotably connected through hinge 47 to piston rod 46 which is slidably mounted in fluidic cylinder 48. Likewise, grip arm 44 is connected through pivot pin 45 to flange 15h. Flange 15h is fixed to cross bar 15f. Grip arm 44 is also pivotably connected to piston rod 50 which is slidably mounted in cylinder 52. Cylinders 48 and 52 are pivotably mounted on cross bar 15f through pins 49 and 51 respectively.

Figure 7:
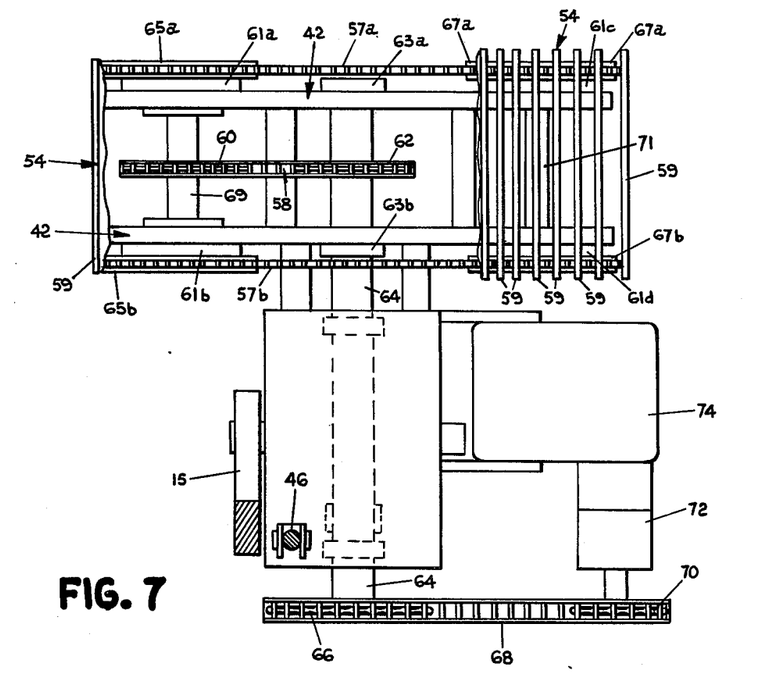
FIG. 7 is an enlarged partially broken side elevational view of the track means taken along the lines 7—7 of FIG. 6.

Within grip arms 42 and 44 are mounted endless tracks 54 and 56 respectively. Endless track 56 is the mirror image of track 54. For brevity, reference will now be made to FIG. 7 for a description of track 54. The endless track 54 comprises a plurality of bars 59 attached to two chains 57a and 57b. Each chain 57a and 57b is trained around sprockets 65a, 67a, 65b and 67b respectively. Sprockets 65a and 65b are mounted on shaft 69 which is rotatably mounted by bearings in cases 61a and 61b to grip arm 42. Likewise, sprockets 67a and 67b are mounted about shaft 71 which is rotatably mounted by bearings in cases 61c and 61d to grip arm 42. Mounted centrally on shaft 69 is a smaller sized sprocket 60. A chain 58 is trained around the sprocket 60 and a sprocket 62 which is centrally located on grip arm 42. Connected to the central longitudinal axis of sprocket 62 is a drive shaft 64 which is attached to a sprocket 66. A chain 68 is trained about an output sprocket 70 of the planetary reduction gear 72 and sprocket 66. The planetary reduction gear is operably connected to the output of of a hydraulic motor 74 to drive the drive shaft 64.

Referring back to FIG. 6, the two grip arms 42 and 44 are adapted for transverse movement about pivot pins 43 and 45 respectively. Grip arms 42 and 44 clamp tree 13. The extension of rods 46 and 50 pivot the arms 42 and 44 about pins 43 and 45 respectively such that the endless tracks 54 and 56 clamp logs of various diameters. Between and to the rear of the two grip arms is an endless track 76 mounted on cross bar 15f. The endless track comprises a plurality of bars attached to two chains 78a and 78b each trained about two sprockets 80 and 82 respectively. The three endless tracks 54, 56, and 76 abut the outer circumference of the tree when the grip arms 42 and 44 firmly clamp tree 13. Each grip arm 42 and 44 has endless tracks 54 and 56 which respectively face the tree 13.

Figures 9, 10:
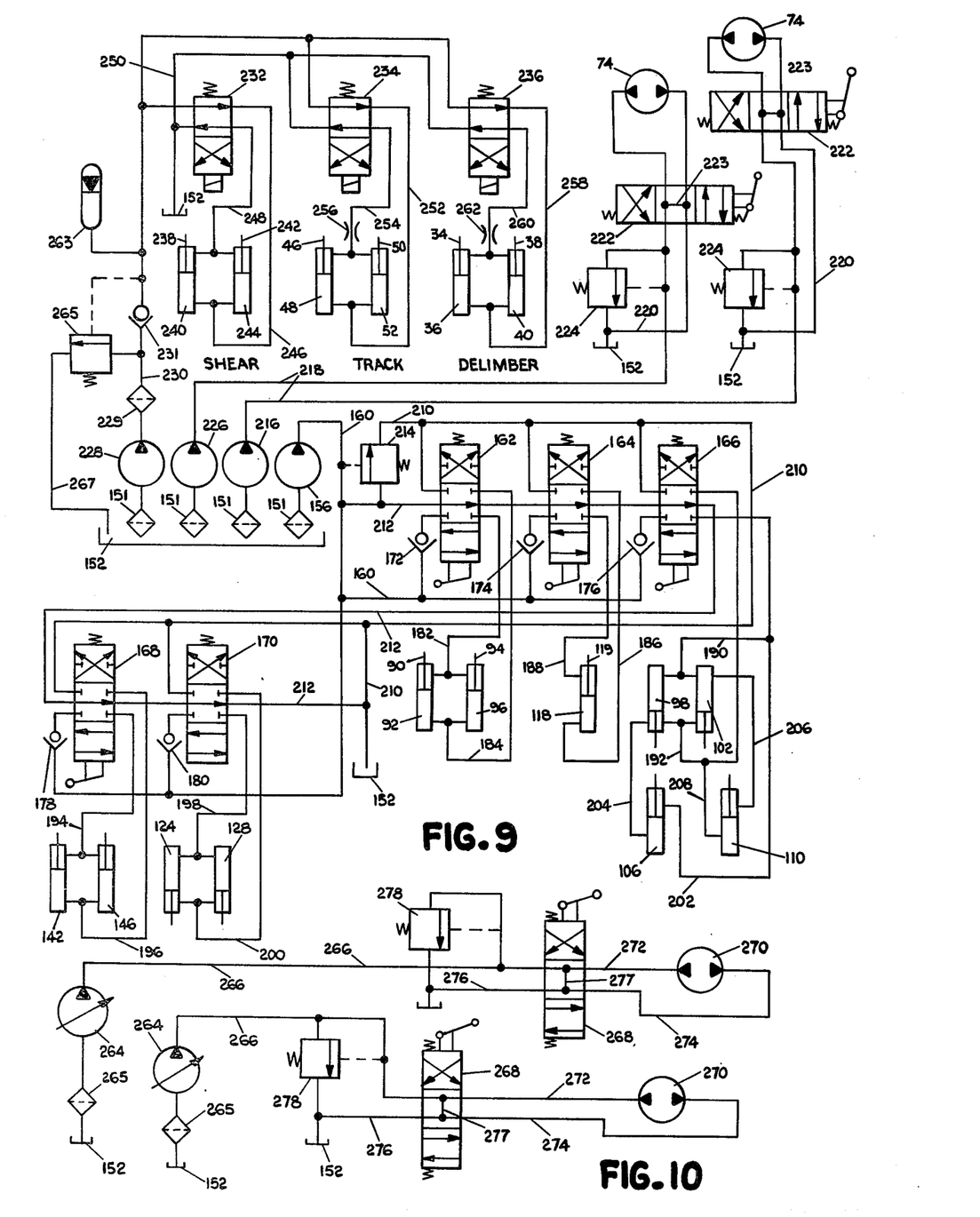
FIG. 9 is a hydraulic schematic diagram of the maneuvering means and processing assembly.
FIG. 10 is a hydraulic schematic diagram of the drive means for the wheels as shown in FIG. 1.

Referring back to FIGS. 1 and 4, at the bottom of frame 15 is attached a shear assembly 84 which is operable to shear through a tree grasped by the grip arms 42 and 44. The shear 84 is conventional in nature. Suffice it to say, the shear assembly has two shears 87 and 89, each pivotably connected through hinge 85 to frame 15. Shear 87 is pivotably jointed through hinges 237 to rod 238 of a fluid cylinder 240. The fluid cylinder 240 is pivotably mounted through hinge 241 to frame 15. The second shear 89 is connected in the same fashion to rod 242 and cylinder 244 is indicated in FIG. 10.

Figure 2:
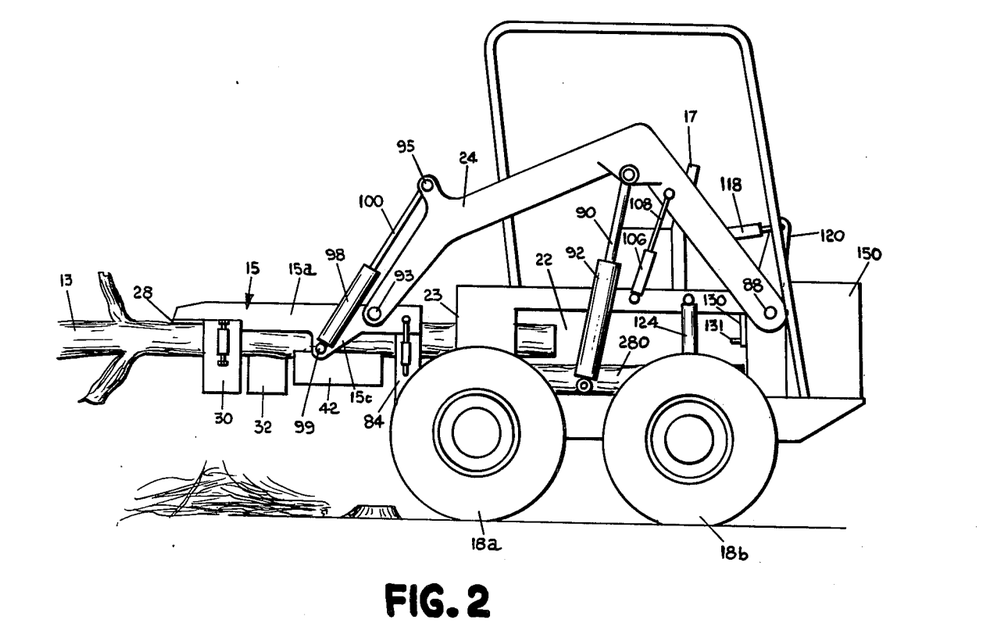
FIG. 2 is a side elevational view of the embodiment shown in FIG. 1 with the processing assembly and felled tree in the horizontal position.
Figure 3:
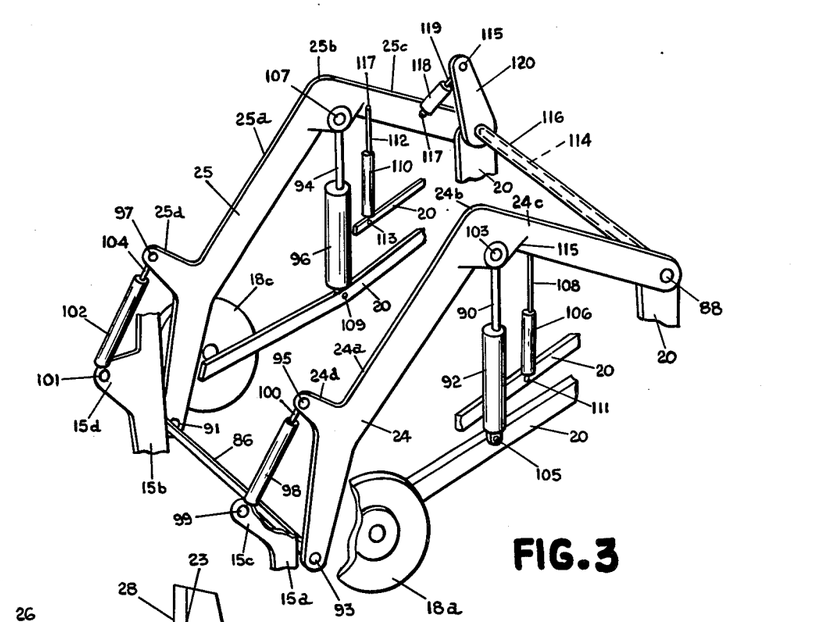
FIG. 3 is a perspective fragmentary and partially schematic view of the maneuvering means of the processing assembly.

Referring to FIGS. 1, 2 and 3, the processing assembly frame 15 is rigidly mounted near a bottom thereof onto a sway bar 86. Near each end of the sway bar 86, the lift arms 24 and 25 are pivotably mounted thereon through pins 91 and 93.

The lift arms 24 and 25 have front portions 24a and 25a arc upwardly and rearwardly to a midsection 24b and 25b respectively. Each front portion 24a and 25a has a forwardly extending protrusion 24d and 25d respectively. The lift arm rear portions 24c and 25c extend downwardly. The rear portions 99 and 101 are pivotably mounted to the chassis 20 at pivot point 88. Piston rod 90 is pivotably mounted through pin 103 to medsection 24b of lift arm 24. Piston rod 90 is slidably mounted to lift cylinder 92. The lift cylinder 92 is pivotably connected through pin 105 to chassis 20. Likewise, piston rod 94 is pivotably connected through pin 107 to the midsection 25b of lift arm 25. Piston rod 94 is slidably mounted in fluid cylinder 96. Fluid cylinder 96 is pivotably mounted through pin 109 to chassis 20. Piston rods 90 and 94 and fluid cylinders 92 and 96 are attached to the same relative positions to their respective lift arms 24 and 25.

Pivotably connected through pins 95 and 97 to the forward protrusions 24d and 25d of lift arms 24 and 25 are piston rods 100 and 104 respectively. The piston rods 100 and 104 are slidably mounted in fluidic cylinders 98 and 102 respectively. Fluid cylinders 98 and 102 are each pivotably mounted through pins 99 and 101 to the protrusions 15c and 15d respectively of processing assembly frame 15.

Pivotably mounted through pins 111 and 113 to the chassis 20 behind the lift cylinders 92 and 96 are fluidic master cylinders 106 and 110 respectively. Piston rods 108 and 112 are slidably mounted respectively to master cylinders 106 and 110 and are pivotably connected through pins 115 and 117 respectively to respective rear portions 24c and 25c of lift arms 24 and 25.

Lift arm 25 is rigidly fixed to shaft 114. Shaft 114 is aligned along the lift arms pivotal axis. Shaft 114 fits within a rigid tube 116. The rigid tube is fixedly attached to lift arm 24. The shaft is free to rotate within tube 116. A sway fluidic cylinder 118 is pivotably mounted through pin 117 to lift arm 25. Piston rod 119 is slidably mounted through pin 115 to arm 120 which is rigidly connected to and transversely extends from tube 116.

Figure 8:
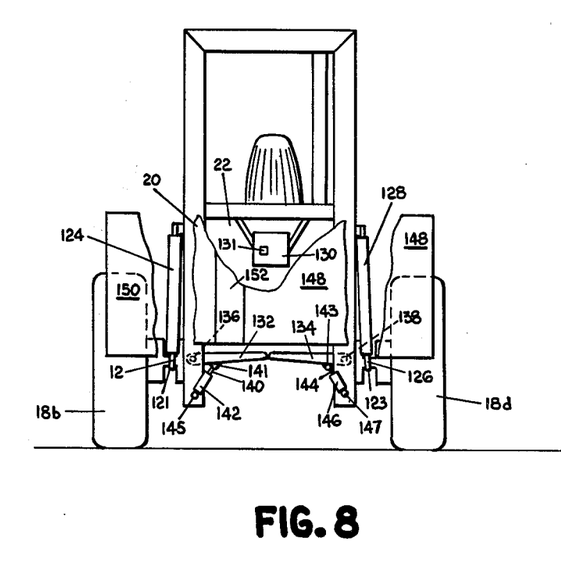
FIG. 8 is a partially broken rear elevational view of the cab portion of the tree harvester shown in FIG. 1.

Referring now to FIGS. 1, 2, and 8, rear wheels 18b and 18d are axially mounted through pins 121 and 123 onto oscillator piston rods 122 and 126 respectively. Piston rods 122 and 126 are mounted on oscillator fluid cylinders 124 and 128 respectively. The cylinders 124 and 126 are mounted on the chassis 20 of the main body. Between the right set of wheels 18a and 18b and the left set of wheels 18c and 18d the chassis 20 has a hollow storage space 22. Storage space 22 has an open front 23 adapted to receive logs from the processing assembly 14. To the reaar portion of the storage area is a stationary target plate 130 mounting a switch 131. The switch is operatively connected to the shear assembly 84 as described in more detail below. When the switch 131 is pressed by a log, the shear assembly 84 is actuated to cut the log to a predetermined length.

At the bottom of the storage area are two pivotable panels 132 and 134 forming the floor of the storage area. The panels are pivotably mounted to the chassis through pins 136 and 138 respectively. Pivotably connected through hinges 141 and 143 to the panels 132 and 134 respectively are two dump rods 140 and 144. The dump rods 140 and 144 are slidably mounted in dump fluidic cylinders 142 and 146 respectively. The fluid cylinders 142 and 146 are pivotably mounted through pins 145 and 147 to the chassis 20. The engine 148, and fuel tank 150, and the oil reserve 152 of the hydraulic system are placed to the rear of the storage area.

Referring now to FIG. 9, the hydraulic system 154 has an oil reserve 152. Hydraulic pump 156 draws oil from the oil reserve 152 and through filter 151. Conduit 160 connects pump 156 to three-position control valves 162, 164, 166, 168, and 170. Preceding each position valve are ball check valves 172, 174, 176, 178, and 180. Three-position control valve 162 controls the extension of piston rods 90 and 94. A first pipe 182 connects the valve 162 to the top side of lift cylinders 92 and 96. A second pipe 184 connects valve 162 to the bottom side of the lift cylinders. One position of valve 152 allows fluid to enter the top side and leave from the bottom side to lower the piston rods 90 and 94. A second position allows fluid to enter the bottom side of the lift cylinder and leave from the top side to extend the piston rods 90 and 94. A third position shuts communication from pump 156 to the lift cylinders.

Three-position valve 164 controls sway cylinder 188 and piston rod 119. Pipe 186 leads from valve 164 to the bottom of sway cylinder 118. Pipe 188 connects valve 164 to the top of the sway cylinder 118.

In the same fashion, pipe 190 connects valve 166 to the closed end of the tilt cylinders 98 and 102. Line 192 connects the piston end of cylinders 98 and 102 to valve 166.

Master cylinders 106 and 110 are fluidically connected to tilt cylinders 98 and 102. Line 202 communicates the closed end of cylinder 98 to the piston end of cylinder 106. Line 204 connects the closed end of cylinder 106 to the piston end of the tilt cylinder 98. In the like fashion, line 206 connects the closed end of tilt cylinder 102 to the piston end of master cylinder 110. Line 208 connects the closed end of master cylinder 110 to the piston end of tilt cylinder 102.

In the same fashion, pipe 194 connects valve 168 to the piston side of dump cylinders 142 and 146. Line 196 connects the closed ends of dump cylinders 142 and 146 to valve 168.

Similarly, line 198 connects valve 170 to the closed end of the oscillator cylinders 124 and 128. Line 200 connects the piston ends of cylinders 124 and 128 to valve 170.

Each of the valves 162, 164, 166, 168, and 170 are connected to a return pipe 210 to allow fluid to return to the oil reservoir 152. Bypass line 212 is operably connected to all valves 162, 164, 166, 168, and 170 to return fluid from the pump to the reservoir when all the valves are in their third position. When any of the valves are in the first or second position, the bypass line 212 is interrupted diverting the oil through line 160. A safety valve 214 is coupled to the bypass line 212 and return line 210 and is sensitive to the pressure in line 160. When the back pressure in line 160 becomes excessive, the valve 214 is open, allowing the fluid to flow from the bypass line directly to the return line and back to the oil reservoir.

Each of the valves 162, 164, 166, 168, and 170 is operably controlled from the cab section through appropriate control levers (not shown).

A second fluidic pump 216 draws oil from the oil reservoir 152 to an output pipe 218 which delivers oil to hydraulic track motor 74 in gripper arm 42. A return pipe 220 returns fluid from the track motor 74 to the oil reservoir 152. Operably connected to both the outlet pipe and return pipe 220 is a three-position valve 222. The first position drives the motor in a forward direction. The second position drives the motor in a reverse direction. And the third position, between the first and second positions, a shunt 223 connects line 218 with line 220 so no fluid goes to motor 74. A safety valve 224 is sensitive to pressure in line 218. When pressure becomes too great, the valve is opened, cutting off the oil pressure to the track motor 74.

Oil pump 226 drives a hydraulic motor in gripper arm 44 in the same fashion as hydraulic motor 74 drives endless track 54. Like parts are represented by like numbers.

Oil pump 228 draws oil from reservoir 152 through filter 229 and to output line 230. A one-way ball valve 231 is placed in line 230. The output line 230 is coupled to valves 232, 234, and 236. Valve 232 controls the extension of pistons 238 and 242 slidably mounted in cylinders 240 and 244 respectively for controlling the position of the shear assembly 84. Pipe 246 leads to the closed end of fluidic cylinders 240 and 244 and pipe 248 leads to the piston end of fluidic cylinders 240 and 244. Each pipe communicates with valve 232. Valve 232 has two positions. In the first position, fluid flows into the closed ends of cylinders to extend the pistons 238 and 242. In the second position, fluid flows into the piston end of cylinders 240 and 244 to retract the pistons 238 and 242. Valve 232 is in communication with return line 250 which returns to the oil reservoir 152.

In like fashion, valve 234 controls the extension of pistons 46 and 50 which are slidably mounted in fluidic cylinders 48 and 52. Line 252 communicates with valve 234 and the closed ends of fluid cylinders 48 and 52. Line 254 communicates with the piston end of fluidic cylinders 48 and 52. Lines 254 have a restriction 256 therein. Valve 234 is connected to return line 250.

In the same fashion, the valve 236 controls the extension of piston 34 and 38 that are slidably mounted in fluidic cylinders 36 and 40 respectively. Line 258 communicates with the valve 236 and closed ends of the fluidic cylinder 36 and 40. Line 260 communicates with the valve 236 and the piston ends of fluidic cylinders 36 and 40. Line 260 has a restriction 262 therein. Valve 236 is coupled to return line 250.

Connected to the output line 230 downside from the one-way ball valve is a gauge 263. A safety valve 265 is connected to the output line 230 upstream from the ball valve 231. Safety valve 265 has its outlet pipe 267 return to the oil reservoir 152. The valve is sensitive to pressure within the output pipe 230 on the downstream side of the ball valve. If the pressure exceeds the safety pressure, the valve is opened and the oil from the outlet 230 returns through valve 265 to oil reservoir 152.

Referring now to FIG. 10, the hydraulic drive system for the wheels is disclosed. The left wheels 18b and 18d are driven by the same mechanism as the right wheels 18a and 18c and the like parts are represented by like numbers. For brevity, only the hydraulic system for the right wheels will be described.

A variable speed oil pump 264 draws oil from the oil reservoir 152 through filter 265. The output pipe 266 communicates with the three-position valve 268. A reversible hydraulic motor 270 communicates with lines 272 and 274. Both lines 272 and 274 also communicate with valve 268. A return line 276 is coupled to valve 268 and returns to the oil reservoir 152. When in the first position, the hydraulic motor 270 is driven in a forward direction. When the valve 268 is in the second position, the hydraulic motor is driven in a reverse position. When the valve 268 is in a third position between the first and second positions, a shunt 277 couples line 266 to return line 276 so no oil pressure is delivered to motor 270.

A safety valve 278 is connected to output line 266 and return line 276. The safety valve is sensitive to the pressure within output line 266 and when the pressure exceeds a certain limit, the safety valve 278 is opened.

The controls to move all the valves 162-170, 232-236, and 268 and to change the speed of the variable speed oil pumps 264 are within the cab section 17.

In operation, the tree harvester 12, travels to a selected harvesting sight under its own power and is maneuvered by operation of the variable speed oil pump 264 and control valve 268 for controlling the speed, direction, and steerability of the harvester.

As the rear wheels 18b and 18d roll over a bumpy surface, the pressurized fluid in the oscillator cylinders act as a shock absorber and leveler. When desired, such as on sandy or muddy land, the oscillator pistons can be extended to raise the chassis with respect to the wheels.

As the harvester is maneuvered to a selected tree 13 for felling, the processing assembly 14 can be maneuvered to engage the tree 13. If the tree 13 is on a hillside, or the tree is positioned at an angle from the vertical, the operator can sway the processing assembly at an angle transverse to the axis of the harvester. The sway piston can be extended from the sway cylinder to move lift arm 25 with respect to lift arm 25 to cause the processing assembly 14 to sway to the left or right.

The lift arm cylinder 92 is in fluidic communication with the lift arm cylinder 96 such that when one lift rod 90 extends or retracts, the rod 94 moves in the opposite direction. Means eliminate any undesirable longitudinal tilting of the processing assembly 14 when the assembly 14 is swayed to the left or right. When the sway piston and cylinder are used to move the lift arms relative to each other, the master rods 100 and 142 in master cylinders 106 and 110 are moved in the corresponding direction as lift rods 90 and 94. The master rods and cylinders sense the height of the lift arms.

The master cylinders 106 and 110 are in fluidic communication with the tilt cylinders 98 and 102 and control the extension of tilt rods 100 and 104. When, for illustration, lift arm 24 is lifted, master rod 108 is then extended and the fluid in the upper section of master cylinder 106 is forced into the closed end of tilt cylinder 98; the fluid in the piston end of tilt cylinder 98 is transferred to the closed end of master cylinder 106. The tilt rod 100 is thus correspondingly extended. Any angular change in the lift arm 24 is sensed by the extension of the master rod and compensated for by a corresponding extension of the tilt rod to maintain the initial longitudinal angle of the assembly frame. The same relationship exists between master cylinder 110 and tilt cylinder 102. Hence, the sway cylinder and rod angle the frame 15 only in a plane transverse to the axis of the harvester.

When the processing assembly is angularly aligned with the angle of the tree 13, the processing assembly can receive the tree 13. The valve 234 is then moved to its first position so that the pistons 46 and 48 become extended and close the gripper arms 42 and 44 about the tree trunk. The shear assembly 84 is then activated by control of valve 232 to shear the trunk assembly in the normal fashion. At this point, as viewed in FIG. 1, the tree is held vertical.

Operation of the lift cylinders 92 and 96 lift the tree from the ground by raising lift arms 24 and 25. As the lift arms lift the tree, the tree remains in the vertical position and does not tilt due to the pivoting action of the lift arms. This condition is obtained by the fluid communication between the master cylinders 106 and 102. As the master piston rods are extended due to the upward pull of the lift arms 24 and 25, the tilt piston rods 100 and 104 are correspondingly extended a degree, as previously described above, to compensate for the angular change of the position of the lift arms 24 and 25.

Once the tree is lifted off the ground, the tree can then be tilted to the horizontal position by full extension of the tilt piston rods 100 and 104 from cylinders 98 and 102 by operation of valve 166. Fluidic pressure in cylinders 98 and 102 force the rods 100 and 104 to extend. The frame 15 rotates about pivot pins 91 and 93. Pivot pins 99 and 101 are moved downward with respect to pins 95 and 97. The motion of pins 99 and 101 cause the frame 15 to tilt horizontally.

As shown in FIG. 2, when the tree is in the horizontal position, the gripper arms 42 and 44 firmly retain the tree in the horizontal position. The two pivotal delimber knives 30 and 32 are then contracted about the tree trunk and the shear 84 is withdrawn to its initial position by movement of valve 232 to its second position. The track motors 74 are then started in a forward direction to draw the tree trunk into the storage area 22 under the cab 17. The three delimber knives 28, 30, and 32 cut off any branches transversely extending from the tree trunk as the tree is pulled into the storage area 22. As the tree trunk extends into the storage space 22, it will eventually hit the stationary target 130 at the rear of the space 22. The track motors 74 will stop due to excess oil pressure buildup in lines 218. The tree also hits switch 131 which actuates the shear assembly 84 to cut through the trunk to create a log of a predetermined length. The log 280, as shown in FIG. 2, then falls into the bottom of the storage space. The track motor then is reactuated to draw in another portion of the trunk into the storage space and the process is repeated. When the tree is fully processed, the processing assembly 14 is brought back to its initial vertical position ready to process another tree.

The storage area is desirably of a size capable of holding a one-half cord pallet of logs. After several trees have been processed and a sufficient number of logs are contained in the sotrage area, the tree harvester is then driven to a desired location where the plurality of logs can be dumped. To dump the logs, rods 140 and 144 are retracted into cylinders 142 and 146 respectively. With the retraction of rods 140 and 144, the floor panels 132 and 134 are pivoted to the vertical position. The bottom of the cab is free from any axles or drive shaft which would inhibit the free fall of the logs 280. The processing assembly 14 is raised by lift arms 24 and 25 above the opening 23 of the storage space 22. The tree harvester is backed up to leave the pile of logs in front of the harvester 12. In this fashion, the tree harvester can selectively harvest a plurality of trees and transport the logs to a desired location where the logs are neatly piled into one-half cord pallets. The tree harvester can maneuver in a relatively small area and maneuver the processing assembly to match the angle of any tree.

Reasonable variation and modification may be made to the above-described embodiment without departing from the spirit and scope of the invention which is defined in the appended claims.

The embodiments of the invention in which an exclusive property or privilege is claimed are defined as follows:

1. A tree harvesting apparatus comprising:
   a processing assembly frame including
      a gripping means mounted thereon for gripping an upright tree adjacent its base;
      shear means mounted thereon below the gripping means for shearing the tree at its base; and
      delimbing means mounted thereon for removing branches from the tree;
   lifting means for lifting the processing assembly off the ground comprising two lift arms pivotably connected to the processing assembly frame at spaced apart pivot points;
   tilting means for tilting the processing assembly frame in a vertical plane from an upright position to a horizontal position; and
   sway means for angling the processing assembly frame along a vertical plane substantially transverse to the plane defined by the tilting movement of the processing assembly; the sway means including means for lifting one lift arm with respect to the second lift arm.

2. A tree harvesting apparatus as defined in claim 1 and further comprising means for maintaining a generally vertical orientation of the processing assembly as the lift means lifts the processing assembly off the ground, the maintaining means includes sensing means for sensing the position of the lift arms, the tilt means operably connected to the sensing means for tilting the processing assembly to compensate for any angular movement of the processing assembly due to the raising of the lift arms.

3. A tree harvesting apparatus as defined in claim 2 and further comprising a self-propelled vehicle coupled to the processing assembly by the lift means and wherein the lift means comprises:
   the lift arms;
   means for pivotably coupling the lift arms to the vehicle and processing assembly;
   extending means for pivotably raising the lift arms;
   means for pivotably coupling the extending means to the lift arms at a position spaced from the means for pivotably coupling the lift arms to the vehicle; and
   means for pivotably coupling the extending means to the vehicle.

4. A tree harvesting apparatus as defined in claim 3 wherein:
   the sway means comprises a shaft fixedly mounted to one lift arm and aligned with the pivotal axis of the lift arm;
   a tube fixedly connected to the other lift arm and concentrically mounted about the shaft with the axis of the tube aligned with the axis of rotation of the second lift arm with respect to the vehicle such that the shaft fits and rotates within the tube;
   a sway arm fixedly mounted to the tube and transversely extending therefrom; and
   means coupled to the transverse arm and the one lift arm for rotating the transverse arm with respect to the shaft whereby one lift arm is moved with respect to the other lift arm.

5. An apparatus as defined in claim 3 and further comprising a storage space within the self-propelled vehicle for receiving and retaining a plurality of logs.

6. An apparatus as defined in claim 5 wherein the processing assembly is positioned adjacent an opening to the storage space and further comprising means for driving the tree into the storage space and means for releasing the logs stored in the storage space.

7. An apparatus as defined in claim 6 and further comprising a switch means mounted in the rear section of the storage space responsive to the tree hitting thereof for actuating the shear means to shear a portion of the tree into a log of predetermined length, the log thereafter dropping into the storage space.

8. A tree harvesting apparatus as defined in claim 1 wherein:
   the sway means comprises a shaft fixedly mounted to one lift arm and aligned with the pivotal axis of the lift arm;
   a tube fixedly connected to the other lift arm and concentrically mounted about the shaft with the axis of the tube aligned with the axis of rotation of the second lift arm with respect to the vehicle such that the shaft fits and rotates within the tube;

a sway arm fixedly mounted to the tube and transversely extending therefrom; and means coupled to the transverse arm and the one lift arm for rotating the transverse arm with respect to the shaft where by one lift arm is moved with respect to the other lift arm.

9. An apparatus as defined in claim 1 and further comprising a storage space within the apparatus for receiving and retaining a plurality of logs.

10. An apparatus as defined in claim 1 wherein the processing assembly is positioned adjacent an opening to the storage space and further comprising means for driving the tree into the storage space and means for releasing the logs stored in the storage space.

11. An apparatus as defined in claim 1 and further comprising a switch means mounted in the rear section of the storage space responsive to the tree hitting thereof for actuating the shear means to shear a portion of the tree into a log of predetermined length, the log thereafter dropping into the storage space.

12. A tree harvesting apparatus comprising:
a self-propelled vehicle having at least four wheels;
an inverted U-shaped frame defining a storage space in the vehicle situated between the wheels and of a size to receive and retain a plurality of logs;
a processing assembly frame mounted to a front portion of the vehicle in front of the storage space including
  gripping means mounting thereon for gripping an upright tree adjacent its base;
  shearing means mounted thereon for shearing the tree at its base below the gripping means and for shearing the trunk into logs of predetermined length;
  tilting means mounted thereon for tilting the tree from an upright position to a horizontal position after the tree has been sheared at its base and while the tree is gripped by the gripping means;
  track means mounted thereon for driving the tree into the storage space;
  delimbing means thereon for removing branches from the tree as the tree is driven into the storage space;
means for mounting drive wheels on the frame free from any axles which protrude into or extend under the storage area;
means for releasing logs stored in the storage area; and
the vehicle being free from obstruction beneath the log releasing means at least one of fore and aft thereof so that the vehicle can deposit the logs on the ground and move forwardly or rearwardly without obstruction from the deposited logs on the ground.

13. A tree harvesting apparatus as defined in claim 12 wherein the tilt means tilting motion is aligned with a vertical plane extending from the front to the rear of the tree harvesting apparatus and further comprising a sway means for rotating the processing assembly in a vertical plane transverse to the plane defined by the tilt motion of the tilt means.

* * * * *